United States Patent Office 3,036,116
Patented May 22, 1962

3,036,116
ANTHRACENE ACIDS AND PROCESS
Hans Muxfeldt, Braunschweig, Germany, assignor to Farbwerke Hoechst Aktiengesellschaft vormals Meister Lucius & Brüning, Frankfurt am Main, Germany, a corporation of Germany
No Drawing. Filed Nov. 19, 1959, Ser. No. 854,023
Claims priority, application Germany Nov. 22, 1958
8 Claims. (Cl. 260—473)

Antibiotics of the general formula

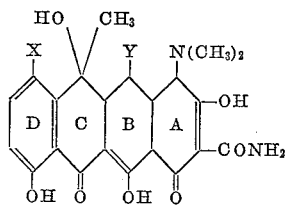

in which X represents hydrogen or chlorine, Y represents hydrogen or—in case X stands for hydrogen—also the hydroxy group, have gained great importance in pharmacy. Up to the present day the compounds are prepared by biological processes. The only synthesis of such tetracyclic compounds or such degradation products containing the tetracyclic ring system has not yet been described.

Now it has been found that there are obtained in a good yield compounds of the general formula

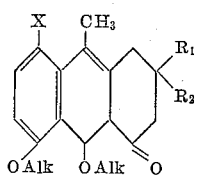

in which X represents hydrogen or chlorine, $R_1$ and $R_2$ stand for a carboxy or carbalkoxy group ($R_1$ may also stand for hydrogen) and alk represents a lower molecular alkyl radical, particularly methyl, by transforming by reduction compounds of the general formula

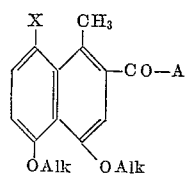

in which X has the meaning given above and A represents a halogen atom, especially chlorine or bromine, or an O-alkyl group, into alcohols of the general formula

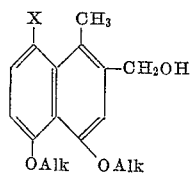

by converting these into the corresponding hydrohalic acid esters or para-toluene-sulfonic acid esters, by condensing the compounds obtained with sodium carbethoxy-succinic acid dialkyl esters or with carbethoxy-methyl-malonic acid dialkyl esters, by cyclisizing the compounds obtained by treatment with polyphosphoric acid and, if necessary, by hydrolyzing the esterified carboxyl groups that may still be present to free carboxyl groups and, if desired, by transforming the dicarboxylic acids formed by decarboxylation into monocarboxylic acids. Alkoxy groups being present can be split, if necessary, by treatment with acids to free hydroxyl groups.

The compounds that come into consideration as starting substances and correspond to the general formula

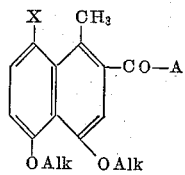

can be obtained by condensation of meta-methoxy-acetophenone with a succinic acid ester and subsequent catalytic hydrogenation of the cis- or trans(meta-methoxyphenyl)-β-carbalkoxy-valeric acid, chlorination of the same and treatment of the reaction mixture with polyphosphoric acid at an elevated temperature, separation of the cis- or trans-8-methoxy-5-chloro-4-methyl-3-carbalkoxy-tetralone, bromination of the same and elimination of hydrogen bromide from the compounds obtained. For the reduction to the corresponding alcohols there are suitable acid halides as well as acid esters. As acid halide there is preferably used the acid bromide and particularly the acid chloride, whereas as esters there come above all into consideration compounds that are derived from low molecular, aliphatic alcohols containing 1 to 4 carbon atoms such as methanol or ethanol. The reduction is carried out with the use of complex metal hydrides, particularly lithium aluminium hydride. The transformation of the acid derivatives into the alcohols is carried out in inert solvents. Preferably there are used ethers; cyclic ethers being also suitable. There may, for example, be mentioned: diethyl ether, dioxane and tetrahydrofurane. Hydrocarbons may also be used as solvents. The reaction temperature is advantageously chosen between −20° C. and +50° C.

The alcohols obtained are then transformed in a manner known per se into the corresponding halides or tosylates. For the preparation of hydrohalic acid esters there come into consideration the customarily used agents such as phosphorus tri- or pentabromide or also thionyl chloride. It is of advantage to add a small amount of pyridine to the reaction mixture. In this reaction stage the reaction temperature should not exceed 50° C. The reaction itself is carried out in the presence of diluents. As such there are suitable ethers, hydrocarbons and above all low molecular aliphatic chlorinated hydrocarbons.

The transformation into the para-toluene-sulfonic acid ester is advantageously carried out with para-tosyl chloride in absolute pyridine.

In order to come from the two-membered ring system of the naphthalene molecule to the three-membered ring system of the anthracene it is necessary to extend the methylene group being present in the form of the hydrohalic acid ester or para-toluene-sulfonic acid ester by condensation with suitable compounds. As suitable compounds there come into consideration carbalkoxy-succinic acid dialkyl esters or carbalkoxy-methyl-malonic acid dialkyl esters in the form of their alkali metal compounds. These alkali metal compounds can be prepared by means of the free alkali metals, preferably by means of alkali metal hydrides or amides. The reaction is carried out in the presence of solvents. There are preferably used inert solvents, above all ether such as diethyl ether, dioxane, tetrahydrofurane and aromatic hydrocarbons such as benzene and the like. However, there may also be used other solvents such as alcohols. In this case, however, it has to be considered that in the presence of alcohols the solvolytic reaction takes place concurrently whereby the yield deteriorates.

It has been found that the condensation products obtained are hydrolized relatively difficultly if in the succinic acid derivative or malonic acid derivative used for condensation all three carboxyl groups are esterified with the same alcohol. The problem of the partial hydrolysis can be solved, however, in an elegant and simple manner by using for the condensation ditertiary butyl-mono-ethyl esters of the succinic acid derivatives or of malonic acid derivatives. In the case of the partial hydrolysis merely the ethyl ester group is split up to the free carboxyl group whereas the two tertiary butyl ester groups remain unchanged.

According to the invention the cyclization of the condensation product to the anthracene-one derivative is carried out with polyphosphoric acid under mild conditions. When using tertiary butyl esters there is no evolution of isobutylene worth mentioning. Consequently, the cyclization product is obtained in a high yield.

By means of the alkaline agents customarily used for hydrolysis the anthracene-one derivative obtained can be partially or completely hydrolyzed and decarboxylated. An acid hydrolysis is generally only possible with simultaneous splitting of the two alkoxyl groups into hydroxyl groups. However, the ditertiary butyl esters can be hydrolyzed pyrolytically with a trace of an acid in an inert solvent, for example benzene, with preservation of the alkoxy groups. The ditertiary butyl esters are already split quantitatively, while heating for five minutes with dilute sodium hydroxide solution, to the corresponding dicarboxylic acid. The partial hydrolysis to the monocarboxylic acid dicarbalkoxy derivative and the decarboxylation are carried out in known manner according to the customary methods of working.

The alkoxy groups being present in the molecule can already be completely dealkylated at room temperature within a short time by concentrated mineral acids so that it is possible in this way to obtain the corresponding dihydroxy compounds in a simple manner. The following scheme of formulae serves for elucidation of the reaction sequence described in the example.

Example (a) To a solution of 104 grams of chloro-terranaphthoic acid dimethyl ether methyl ester in one liter of absolute ether there are added dropwise, while stirring and cooling with ice, 275 cc. of a 1.5 N lithium aluminum hydride solution. When all of the solution has been added, the reaction mixture is stirred for another hour, the excess of the lithium aluminum hydride is cautiously destroyed by means of methanol and the reaction mixture is extracted by means of 2 N-hydrochloric acid. The ether solution is diluted with 200 cc. of chloroform and, after washing with water, and drying over sodium sulfate, the solvents are completely distilled off. The crystalline residue is taken up in 200 cc. of chloroform and 1 liter of petroleum ether (boiling point 40–60° C.) is slowly added to the solution. The reaction mixture is allowed to stand for several hours and the reduction product that has crystallized out is then filtered off with suction. The precipitate is washed with a little ether. There are thus obtained 74 grams (=79% of the theoretical yield) of the pure chloroterranaphthol-dimethyl ether melting at 120° C.

($b_1$) 20 grams of chloro-terranaphthol-dimethyl ether are dissolved in 500 cc. of absolute chloroform and 0.2 cc. of pyridine and 2.9 cc. of phosphorus tribromide are added thereto. The mixture is boiled for 2 hours under reflux. After cooling the reaction mixture is washed with water, sodium bicarbonate solution and again with water. The solution is then dried over sodium sulfate and the solvent is distilled off under reduced pressure. The crystalline residue represents the chloro-terranaphthyl bromide dimethyl ether. The compound can directly be used for further condensation.

($b_2$) 85 grams of chloro-terranaphthol-dimethyl ether are dissolved in 300 cc. of absolute pyridine. 65 grams of para-tosyl chloride are slowly added to the mass while stirring vigorously and cooling, so that the temperature does not exceed +5° C. The reaction mixture is then

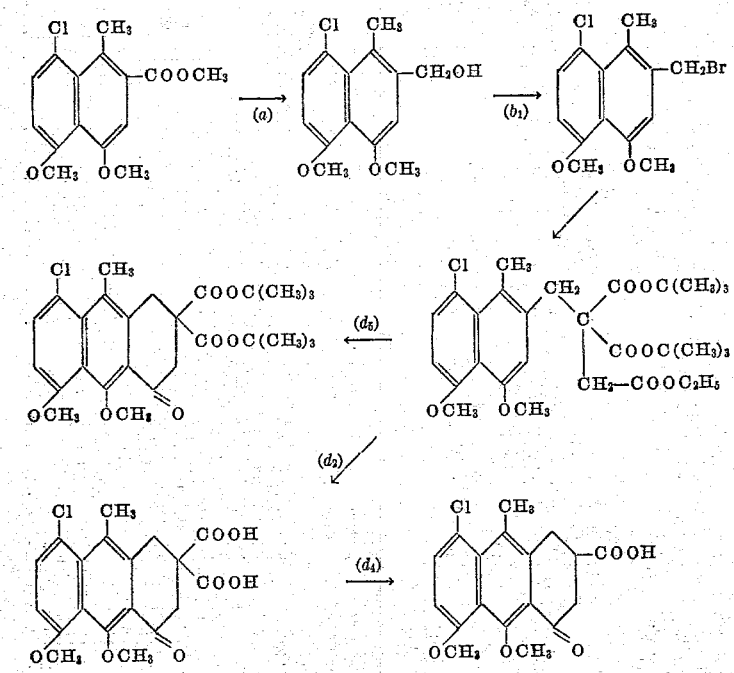

The products obtained by the process of the present invention are valuable intermediate products for synthesis of pharmaceutically valuable compounds such as those of the tetracycline group.

The following example serves to illustrate the invention but it is not intended to limit it thereto:

allowed to stand for 12 hours in a refrigerator. It is diluted with 2 liters of chloroform, the pyridine is extracted with ice cold dilute hydrochloric acid and the chloroform solution is washed with sodium bicarbonate and water. After drying over sodium sulfate the solvent is distilled off at 40° C. under reduced pressure.

The crystalline residue represents the tosylate of the chloro-terranaphthol dimethyl ether than can directly be used for condensation with the sodium carbethoxy-methyl-malonic acid ester without further purification.

($c_1$) 100 grams of chloro-terranaphthol-dimethyl ether are transformed with phosphorus tribromide into the bromide as described under ($b_1$). 120 grams of carbethoxy-succinic acid diethyl ester are slowly added dropwise to a suspension of 20 grams of sodium hydride in 200 cc. of benzene, the mixture is stirred at room temperature until the evolution of hydrogen has ceased (about 3 hours). The solution is decanted from the sodium hydride, combined with a solution of the terranaphthyl-bromide dimethyl ether in 500 cc. of absolute benzene and boiled for 2 hours under reflux. Aftere cooling, the reaction mixture is diluted with 500 cc. of ether, washed with 1 N-hydrochloric acid and water, dried and the solvent is completely distilled off. The yellow brown residue is mixed with 100 cc. of methanol and, when the crystallization has set in, allowed to stand for several hours in the deep-freezing refrigerator. The mother liquor is filtered off with suction and the filter residue is washed well with methanol. By concentrating the filtrate a further fraction crystallizes out in the deep-freezing refrigerator. There are obtained altogether 135 grams (75% of the theoretical yield) of the dimethyl ether of the α-(chloroterranaphthyl)-α-carbethoxy-succinic acid diethyl ester melting at 81–83° C. After repeated recrystallization from methanol the compound has a constant melting point of 83–84° C.

($c_2$)(α) 290 grams of malonic acid ditertiary butyl ester are added to a solution of 33.5 grams of sodium in 750 cc. of absolute ethanol. To this mixture there are added dropwise 250 grams of bromoacetic acid ethyl ester. The reaction mixture is then heated for 15 minutes on the boiling water bath, diluted with 3 liters of water, the ester is extracted by means of ether and the ether solution is distilled after washing with water and drying over sodium sulfate. There remains an oil that is distilled under reduced pressure. There are obtained 130 grams of a fraction boiling between 161 and 163° C. (14 mm.) that represents the carbethoxy-methyl-malonic acid ditertiary butyl ester.

($c_2$)(β) 85 grams of the dimethyl ether of the chloro-terranaphthol are transformed into the bromide or tosylate in the manner described under ($b_1$) or ($b_2$). From the bromide or tosylate obtained there is prepared a solution in 400 cc. of absolute benzene.

In addition, there is prepared a solution of sodium carbethoxy-methyl-malonic acid ditertiary butyl ester in tetrahydrofurane by slowly adding dropwise 92 grams of the ester into a suspension of 20 grams of sodium hydride in 400 cc. of absolute tetrahydrofurane, stirring the mixture for 3 hours at room temperature and decanting the solution from the sodium hydride in excess. The solution thus obtained is combined with the solution of the bromide or tosylate, the main quantity of the tetrahydrofurane is distilled off with exclusion of humidity and the remaining benzene solution is boiled for two hours under reflux. After cooling the soluton is washed with 1/100 N-hydrochloric acid, dried and freed from the solvent. The hot oily residue is taken up in 300 cc. of methanol. The crystallization of the condensation product sets in after a short time. The whole is allowed to stand for several hours, the crystallisate that has separated is filtered off with suction and washed with methanol. By concentrating the mother liquor there is obtained a second fraction, the mother liquor of which yields a third fraction upon standing in the deep-freezing refrigerator. The total yield of the condensation product of the formula

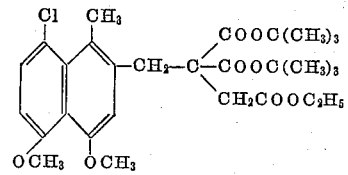

amounts to 148 grams (84% of the theoretical yield). A sample of the compound recrystallized repeatedly from methanol melts at 94–95° C. However, the raw product can be subjected without further purification to the cyclization reaction and partial hydrolysis hereinafter described.

($d_1$) 132 grams of the dimethyl ether of the α-(chloro-terranaphthyl)-α-carbethoxy-succinic acid diethyl ester are heated to boiling for 35 minutes under reflux with 1.5 liters of an ethanolic potassium hydroxide solution of 5% strength. The mixture is then poured into 2 liters of water, extracted by means of ether, the aqueous phase is acidified with dilute hydrochloric acid and extracted with chloroform. The chloroform extract is washed with water, dried and the solvent is completely distilled off. The residue is mixed with 150 cc. of glacial acetic acid and the solution is stirred for 25 minutes at 70° C. with 500 cc. of polyphosphoric acid. The mixture is then poured on ice water. The reaction product is extracted with ether. The extract is freed by filtration from black flocculant impurities, washed with sodium carbonate solution and water, dried and finally evaporated. There remain 66 grams of a brown oil that is mixed with 100 cc. of ether. When the crystallization has set in, the mixture is allowed to stand for several hours in the deep-freezing refrigerator. The crystals that have precipitated are separated from the solution by filtering with suction and the filter residue is washed well with ether. There are obtained 10.2 grams (=8.5% of the theoretical yield) of the 1.2.3.4-tetrahydro-3.3-dicarbethoxy - 9 - methyl - 5- chloro - 8.10 - dimethoxy-anthracene-1-one. The compound melts at 120–123° C. A sample recrystallized repeatedly from methanol melts at 124.5–126.5° C.

($d_2$) From the filtrate of the product obtained according to ($d_1$) the solvent is completely distilled off. The residue is taken up in benzene and the solution obtained is filtered through a column of acid silica gel. Benzene is used for the additional washing. The filtrate is completely evaporated and the oily residue (45 grams) is boiled for 1 hour under reflux with 100 cc. of methanol and 100 cc. of a sodium hydroxide solution of 10% strength, in which 2 grams of sodium dithionite are dissolved. The yellow brown solution is diluted with 500 cc. of water and acidified. The reaction mixture is allowed to stand for several hours, the semi-solid precipitate is filtered off with suction and recrystallized from 50 cc. of glacial acetic acid. The crystallisate that has separated is filtered off with suction after some time and the filter residue is washed well with chloroform and ether. There are thus obtained 11.2 grams of a dicarboxylic acid of the formula

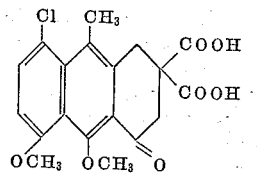

that can be worked up without further purification.

The solvent is completely distilled off from the mother liquor, the residue is taken up in 50 cc. of phthalic acid diethyl ester, and the solution is heated to 170° C. until no more carbon dioxide evolves. After cooling the reaction mixture is diluted with 300 cc. of ether, extracted exhaustively with a sodium carbonate solution of 5% strength, the sodium carbonate extract is acidified, the acidified extract is extracted with chloroform and the chloroform solution is adsorbed at acid silica gel. On washing with chloroform a light yellow zone passes quickly through the column, the eluate of which is rejected. From the dark brown zone adhering to the upper part of the column there separates slowly a deep yellow zone that is eluated, after cutting up the column, by means of a mixture of chloroform and acetone in a proportion of 10:1. The eluate is concentrated, taken up in 10 cc. of acetone and 150 cc. of benzene, and the acetone is distilled off azeotropically. After standing for several hours the 1.2.3.4-tetrahydro-3.3 - dicarbethoxy - 9 - methyl - 5 - chloro - 8.10 - dimethoxy-anthracene-1-one that has crystallized out is separated from the mother liquor by filtering with suction. The filter residue is washed with ether and dried. The yield of monocarboxylic acid amounts to 3.6 grams.

($d_3$) 10.2 grams of 1.2.3.4-tetrahydro-3.3-carbethoxy-9-methyl-5-chloro-8.10-dimethoxy-anthracene-1-one (obtained in the manner as described under ($d_1$)) are boiled for one hour under reflux with a mixture of 75 cc. of methanol and 75 cc. of a sodium hydroxide solution of 10% strength containing 2 grams of sodium dithionite in the dissolved state, the solution is diluted with 500 cc. of hot water and the boiling solution is acidified. After cooling the reaction product that has crystallized out is filtered off with suction, the filter residue is washed well with water and dried. The yield of dicarboxylic acid (formula see under ($d_2$)) amounts to 8.40 grams (94% of the theoretical yield). When heated the compound melts between 165 and 170° C. with evolution of carbon dioxide.

($d_4$) The 8.40 grams or 11.2 grams of dicarboxylic acid of the formula

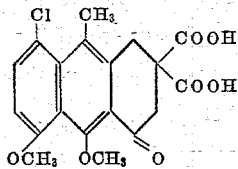

obtained by the hydrolysis as described under ($d_2$) and ($d_3$) are suspended in 75 cc. of phthalic acid diethyl ester. The mixture is heated in an oil bath to 170° C. After the evolution of carbon dioxide has ceased the reaction mixture is diluted with 200 cc. of ether and allowed to stand for several hours. The crystal magma that has separated is filtered off with suction and carefully washed with ether. The filtrate is exhaustively extracted with a sodium carbonate solution of 5% strength, the acidified sodium carbonate solution is extracted with chloroform, the chloroform extract is concentrated to 50 cc. and allowed to stand for several hours. The precipitate that has separated is filtered off with suction and washed well with a little chloroform. The mother liquor is adsorbed on acid silica gel. After a weakly yellowish zone has been eluated when washing with chloroform, the deep yellow zone slowly passing through the column is cut out and eluated with a mixture of chloroform and acetone in a proportion of 10:1. The eluate is evaporated to dryness, the residue is taken up in a mixture of 10 cc. of acetone and 15 cc. of benzene and the acetone is distilled off azeotropically. The solution is allowed to stand for several hours and the third fraction of 1.2.3.4-tetrahydro-3-carboxy-9-methyl-5-chloro-8.10-dimethoxy-anthracene-1-one that has separated is filtered off with suction. The filter residue is washed with ether and dried. There are obtained altogether 13.2 grams (=88% of the theoretical yield) of the said compound melting at 218–220° C.

($d_5$) 140 grams of the ester of the formula

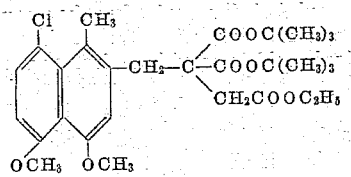

are dissolved in 1500 cc. of boiling methanol. To the solution there are added within 5 minutes 350 cc. of an aqueous potassium hydroxide solution of 5% strength. The mixture is boiled for about 20 minutes until a sample of the solution does no longer become turbid when diluted with water. The brown solution of the partially hydrolyzed ester is shaken with a little animal charcoal, filtered and acidified. The monocarboxylic acid of the formula

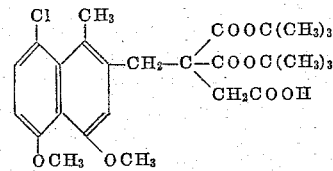

that separates is extracted with chloroform, the chloroform extract is dried and the solvent is distilled off. The residue is taken up in 250 cc. of glacial acetic acid and the solution is diluted with 1500 cc. of polyphosphoric acid. The mixture is then heated for 2 hours at 60° C. The solution turning deep red is poured, while stirring vigorously, into much water and the reaction product is extracted with ether. The ether extract is freed by filtration from black flocculent decomposition products and exhaustively extracted with sodium carbonate solution. The ether extract is washed well with water, 300 cc. of benzene are added thereto and the mixture is dried over sodium sulfate. After elimination of the solvent there remain 104 grams of a yellow oil that crystallizes upon trituration with 200 cc. of ether. There is thus obtained a first fraction of the compound of the formula

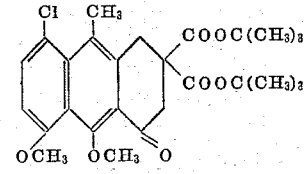

in a quantity of 64 grams. By concentrating the mother liquor a second fraction of the compound is obtained in a quantity of 16 grams. The remaining mother liquor is freed from the ether, the residue is dissolved in benzene and the solution is filtered through a silica gel column. The filtrate is evaporated. By trituration of the residue with ether a third fraction amounting to 8 grams is obtained so that the total yield of the compound of the formula

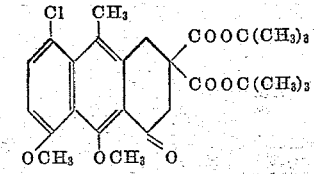

amounts to 88 grams (=70% of the theoretical yield). The raw product thus obtained that can be hydrolyzed without further purification to the free dicarboxylic acid, melts between 126° C. and 130° C., whereas a sample recrystallized from methanol melts at 131–132° C.

($d_6$) 84 grams of the tertiary butyl ester obtained according to ($d_5$) are dissolved in 1 liter of methanol and the solution is heated to boiling. To the boiling solution there are added dropwise, within 10 minutes, 500 cc. of sodium hydroxide solution of 20% strength in which 5 grams of sodium dithionite had previously been dissolved. The mixture is boiled for a further 5 minutes under reflux, diluted with 3 liters of boiling water and acidified with concentrated hydrochloric acid. After cooling the dicarboxylic acid of the formula

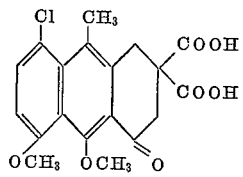

that has crystallized out is filtered off with suction, the filter residue is washed with water and dried under reduced pressure. There are obtained 62 grams (=96% of the theoretical yield) of dicarboxylic acid.

($d_7$) 200 milligrams of carboxy-5-chloro-8.9-dimethoxy - 10 - methyl - 1.2.3.4 - tetrahydro - anthracene - 1-one are dissolved in 5 cc. of hot glacial acetic acid. 20 cc. of concentrated hydrochloric acid are added to the solution and the mixture is allowed to stand for 3 hours at room temperature. The solution that is at first red and later on turns yellow, from which the demethylation product has partly separated, is diluted with water and the mixture is extracted with chloroform. When concentrating the chloroform extract the 3-carboxy-5-chloro-8.9-dihydroxy-10-methyl-1.2.3.4-tetrahydro-anthracene-1-one separates in the form of orange crystals. The yield amounts to 162 milligrams (=88% of the theoretical yield). After repeated recrystallization from benzene the compound melts at 196–197° C.

I claim:

1. A compound of the formula

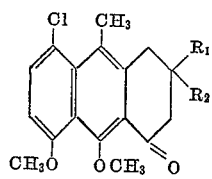

wherein $R_1$ is a member selected from the group consisting of hydrogen, carboxy, and carbalkoxy the alkyl portion of which has 1 to 4 carbon atoms, and $R_2$ is a member selected from the group consisting of carboxy and carbalkoxy the alkyl portion of which has 1 to 4 carbon atoms.

2. A compound of the formula

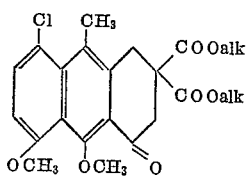

wherein alk stands for alkyl having up to 4 carbon atoms.

3. A compound of the formula

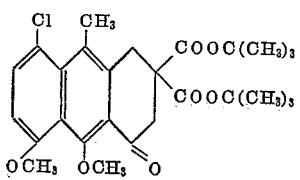

4. The compound of the formula

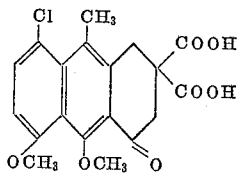

5. The compound of the formula

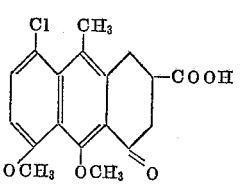

6. The method of making a compound of the formula

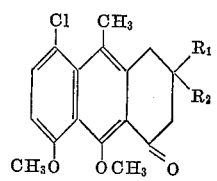

wherein $R_1$ and $R_2$ are selected from the group consisting of carbethoxy and carbo-t-butoxy which comprises contacting a first compound of the formula

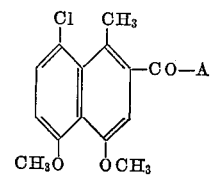

where A is a member selected from the group consisting of chlorine, bromine, and alkoxy the alkyl portion of which has 1 to 4 carbon atoms, with lithium aluminum hydride, whereby said first compound is reduced to form an alcohol; then contacting said alcohol with a member of the group consisting of phosphorus tribromide, phosphorus pentabromide, thionyl chloride, and paratoluenesulfonic acid chloride, whereby a second compound, corresponding with halides and tosylates of said alcohol, is formed; then contacting said second compound with a member of the group consisting of sodium carbethoxy succinic acid diethyl ester and sodium carbethoxy methyl malonic acid di-t-butyl ester, whereby a third compound, which is a condensate of the reactants, is formed; and then contacting said third compound with polyphosphoric acid, whereby said third compound is cyclized to form the product.

7. A method as in claim 6 wherein said product is contacted with a dilute solution of an alkali metal hydroxide, whereby said groups $R_1$ and $R_2$ are hydrolyzed to carboxy groups to form a dicarboxylic acid.

8. A method as in claim 7 wherein said dicarboxylic acid is heated at a temperature above 170° C., whereby decarboxylation occurs and a monocarboxylic acid is formed.

References Cited in the file of this patent

Muxfeldt et al.: Chem. Abst., 53, 16088, Sept. 10, 1959 (citing Abhandl. Braunschweig. wiss. Ges., 10, 1 to 8 (1958)).